United States Patent [19]
Stack

[11] Patent Number: 6,076,070
[45] Date of Patent: Jun. 13, 2000

[54] APPARATUS AND METHOD FOR ON-LINE PRICE COMPARISON OF COMPETITOR'S GOODS AND/OR SERVICES OVER A COMPUTER NETWORK

[75] Inventor: Charles Stack, Cleveland, Ohio

[73] Assignee: Cendant Publishing, Inc., Aurora, Colo.

[21] Appl. No.: 09/121,094

[22] Filed: Jul. 23, 1998

[51] Int. Cl.[7] .................................................. G06R 17/60
[52] U.S. Cl. ........................................ 705/20; 235/375
[58] Field of Search ................................ 705/20; 235/375

[56] References Cited

U.S. PATENT DOCUMENTS 5,873,069   2/1999   Reuhl ........................................ 705/20

*Primary Examiner*—Harold I. Pitts
*Attorney, Agent, or Firm*—Rothwell, Figg, Ernst & Kurz

[57] ABSTRACT

A method and apparatus are provided for a computer-implemented on-line price comparison method for performing price comparison and price reduction of goods and/or services sold by a vendor over a computer network, such as the Internet. The price comparison method can be selected by a customer, whereupon the computer program requests a competitor's price by transmitting a price request over the computer network. When the competitor's price is received, it is displayed to the customer. The computer program compares the competitor's price to the item price for the specified item. If the competitor's price is higher, nothing is done. If the competitor's price is lower, however, the computer program presents to the customer the option of requesting a reduced price. If the customer requests a reduced price, the computer program checks to see if the competitor's price is below a predetermined threshold. If it is, the computer program advises the customer to buy the specified item from the competitor. If the competitor's price is not below the threshold, the vendor's item price is reduced and displayed to the customer, who may now purchase the product at a price lower than that of the competition.

32 Claims, 5 Drawing Sheets

APPARATUS AND METHOD FOR ON-LINE PRICE COMPARISON OF COMPETITOR'S GOODS AND/OR SERVICES OVER A COMPUTER NETWORK

BACKGROUND OF THE INVENTION

1. Field of the Invention

The present invention relates generally to the use of computer networks (such as the Internet) for the purchase of goods and/or services, and more specifically relates to a computer-implemented method for on-line comparison of competitors' prices and automatic price reduction, over a distributed computer network such as the Internet's World Wide Web.

2. Description of Background Art

On-line shopping is the display and sales of goods over a computer network. On-line shopping has exploded in popularity in recent years, as more and more people use computer networks. Generally, a potential customer can visit an on-line shopping site and can view selections or request specific items. The customer can place an order, pay for it using a credit card, and have it delivered to his or her home. The commercial importance of on-line shopping is rapidly growing as more and more people use the Internet. Surveys show that 5.6 million people have purchased products and services on-line over a recent 12 month period. These purchases were made by approximately 27 percent of the adult Internet users. Estimates are that 55 million adults will become Internet users in the near future.

On-line shopping is enjoying widespread popularity because of several attributes. In a survey of Internet users, the most-cited reasons for using on-line shopping were convenience, availability of vendor information, no pressure from sales people, and time savings. The greatest attribute for consumers is the convenience it offers. On-line shopping can be done at home, at work, at a library, or anywhere a person can gain access to a computer network. The second convenience factor is the ability to browse or shop at any time, day or night, in bad weather, or on weekends or holidays. Also, on-line shopping provides a much needed service to people who have difficulty getting out to conventional stores, such as elderly, shut-ins, or persons with small children. Further advantages are the opportunities for shoppers to compare goods and prices of competitors nearly simultaneously, allowing shoppers to perform price comparisons and choose the item with the best price or value.

On-line shopping has advantages for vendors, also. It gives vendors access to an enormous international base of potential customers. It requires lower overhead than a conventional store. It also allows for greater flexibility to a vendor, because changes in goods and prices can be made instantly, while allowing the vendor to simultaneously provide shoppers with information about each product. This flexibility is important in that it gives vendors the opportunity to be more competitive by being able to react quickly to changes in price by competitors.

Vendors who wish to be competitive with competitors must constantly be aware of the prices of their competitors. Prices of goods for sale on computer networks, as in conventional stores, generally stay relatively fixed, but there is always some price-jockeying by some vendors who wish to be able to claim the lowest prices. Currently, three main approaches exist for performing price comparisons (and therefore, indirectly, price adjustments). A vendor can make periodic comparisons with competitors' prices, can compare competitors' prices when a customer complains, or can compare prices when a customer makes a price inquiry.

Periodic comparisons of the prices of competitors have drawbacks in that periodic comparisons may not reliably keep up with changes by competitors. Also, a great amount of effort is required in comparing all prices of all common products against a fixed set of competitors.

Price comparisons when a customer complains incur less work than periodic comparisons, but have other drawbacks. By not changing price more or less in synch with the competition, a vendor may unknowingly lose existing or potential customers who are turned away by a higher displayed price. Also, it will make the vendor less competitive by having no reputation for lower prices.

Making price comparisons whenever a customer makes a price inquiry, while potentially making a vendor competitive, requires a vendor to manually and individually seek prices of competitors' products, which is slow and cumbersome and does not lend itself to real-time responses to customers' on-line queries.

The drawback of manual price comparisons for the on-line customer is that the customer may have to visit many sites in order to find the lowest price. The customer may then have difficulty in getting back to the site having the lowest price, or it may take too much time or effort to return. The net effect for a vendor may be that a customer may not return to his or her site.

There thus exists a need in the art for a computer-implemented on-line price comparison and adjustment capability, that enables a vendor to assure a customer that she is getting the best price available for goods and/or services ordered through the network.

SUMMARY OF THE INVENTION

It is therefore an object of this invention to provide a method for computer-implemented price comparison of competitors' wares.

It is yet another object of the invention to provide a price comparison method whereby a customer can initiate the price comparison.

It is yet another object of the invention to provide a price comparison method whereby the item price can be reduced if a competitor's price is lower.

It is yet another object of the invention to provide a price comparison method whereby a customer can initiate the price reduction.

It is yet another object of the invention to provide a price comparison method wherein the price reduction is performed only if the competitor's price is not below a predetermined minimum threshold.

A method is provided for a computer implemented on-line price comparison over a computer network according to a first aspect of this invention. The method comprises requesting a competitor's price for an item over the computer network, detecting whether the competitor's price was received, displaying the competitor's price, decreasing an item price by a predetermined amount to create a new price if the competitor's price is less than the item price and the competitor's price is greater than a predetermined threshold, and displaying the new price.

A method is provided for a computer implemented on-line price comparison over a computer network according to a second aspect of this invention. The method comprises requesting a competitor's price for an item over the computer network in response to a request by a customer, detecting whether the price was received, displaying the competitor's price for the item if the competitor's price was received and displaying an error message if the competitor's price was not received, comparing the competitor's price to an item price, comparing the competitor's price to a predetermined threshold if the competitor's price is less than the item price, decreasing the item price by a predetermined amount to create a new price if the competitor's price is less than a predetermined threshold in response to a request by the customer, and displaying the new price.

An apparatus is provided for performing a computer implemented on-line price comparison over a computer network according to a third aspect of the invention. The on-line price comparison apparatus comprises a storage medium for storing an item price, an input for receiving a comparison request for a competitor's price, a procurement computer program for procuring the competitor's price over the computer network, a display for displaying the item price and the competitor's price, a comparison computer program for comparing the item price and the competitor's price, and an adjustment computer program for adjusting the item price by a predetermined amount to create a new price if the item price is greater than the competitor's price and the competitor's price is greater than a predetermined threshold.

The above and other objects, features and advantages of the present invention will become clear from the following description of the preferred embodiment thereof, taken in conjunction with the accompanying drawings.

DETAILED DESCRIPTION OF THE PREFERRED EMBODIMENTS

Figure 1:
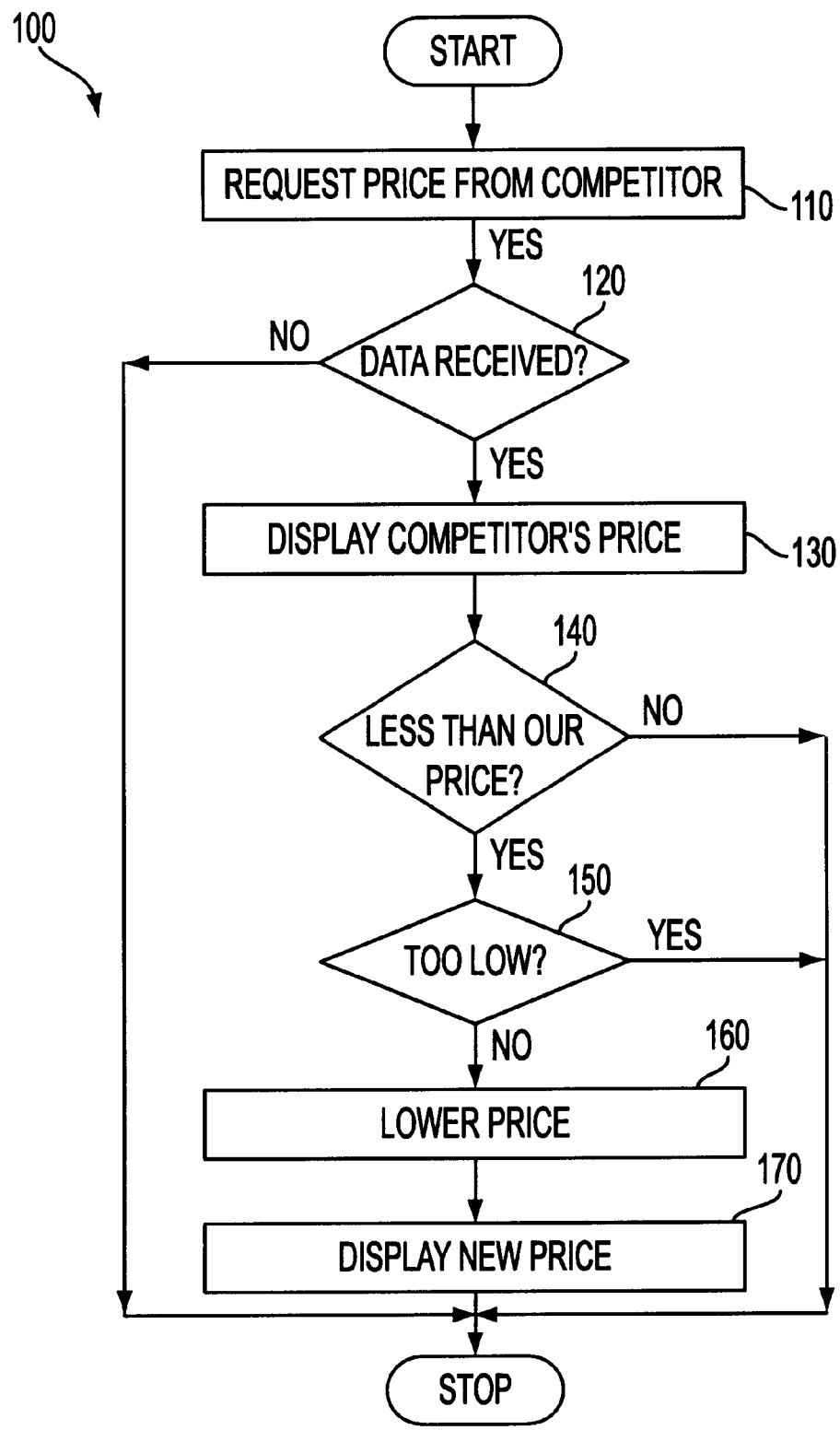
FIG. 1 shows a flowchart 100 of an overview of the method according to one preferred embodiment of the present invention.

Referring now to FIG. 1, there is shown a flowchart 100 illustrating an embodiment of the present invention. In step 110, a competitor's price is requested. The price request may be directly or indirectly initiated as a result of interest on the part of a customer. As should be apparent, a price comparison can be initiated by various customer actions. In the preferred embodiment, the price comparison is prompted by an on-line request by the customer for information on a specified item, such as a book, including the price. Typically, in the preferred embodiment, the customer will be presented with a listing of book titles from which he can choose. The information request brings up a selection button display (see FIG. 3) which can be used by the customer to initiate a price comparison. Then, in step 120, a check is made to see if a response was received from the competitor's server. If a response was received the method proceeds to step 130, otherwise it terminates. In step 130, the competitor's price is displayed to the customer. Next, in step 140, the computer program compares the competitor's price for the item to the vendor's price. If the competitor's price is less than (or alternatively equal to) the vendor's price, then the method proceeds to step 150. If the vendor's price is already lower than the competitor's price, there is no need to perform price reduction and the method terminates. In step 150, the competitor's price is compared to a predetermined threshold to see if the vendor's item price can be reduced. If the competitor's price is below the predetermined threshold, the item price will not be lowered to be less than or equal to the competitor's price. In this way, the vendor can set a lower limit beyond which he or she will not reduce the item price. This feature prevents automatic price reduction below the vendor's cost or below a minimum target profit. In step 160, if it has been determined that the item price can be lowered, the item price is lowered to create a new price for the specified item. The amount by which the item price may be lowered is set by the vendor. In step 170 the new price is displayed to the customer, at which time the customer may elect to purchase the item.

Figure 2A:
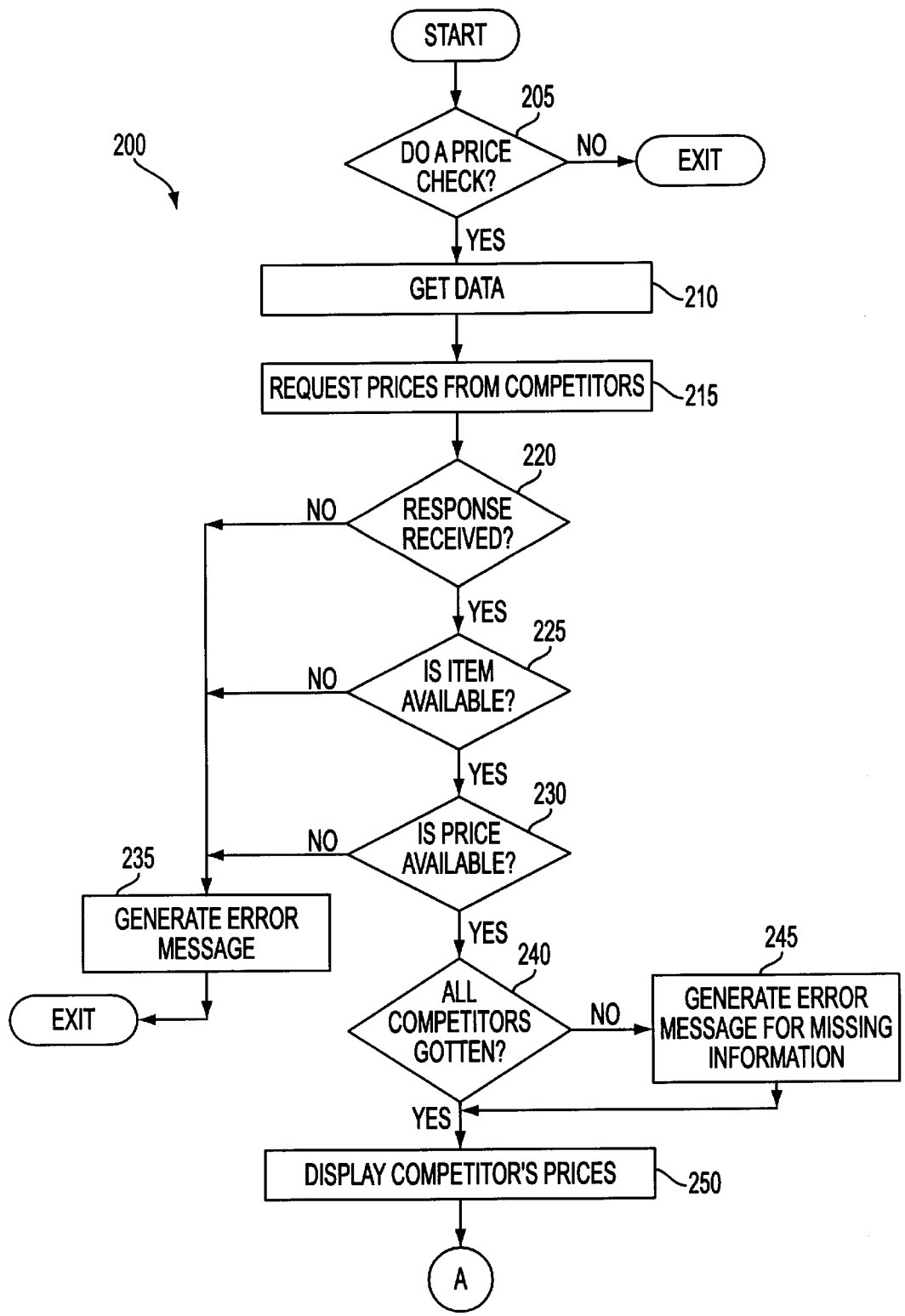
FIGS. 2A and 2B show a flowchart 200 of a detailed price comparison method according to the present invention.
Figure 2B:
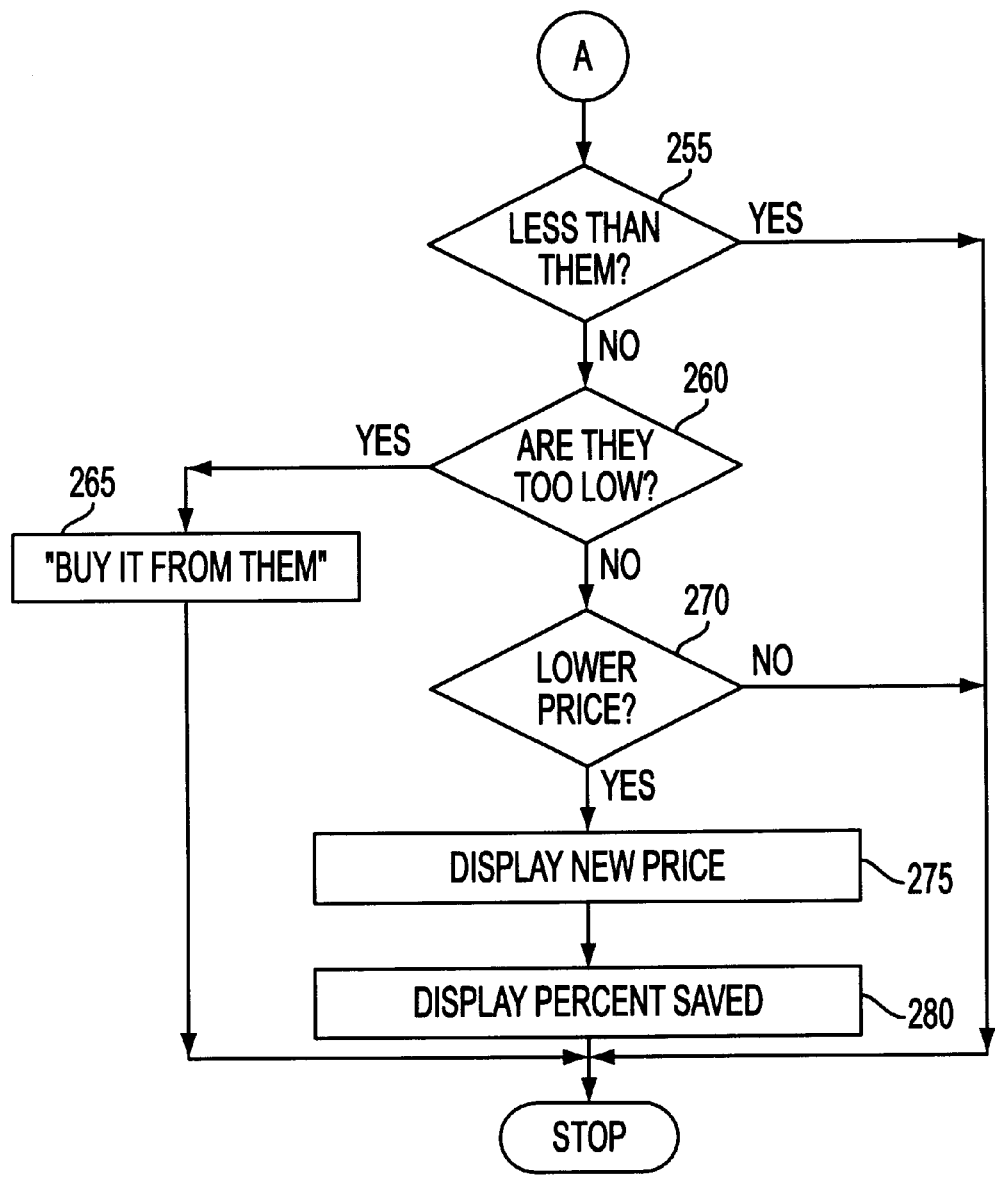

Referring now to FIGS. 2A–2B, there is shown a flowchart 200 illustrating a preferred embodiment of the present invention. In step 205, the computer-implemented method provides a display on the customer's screen asking the customer whether he or she would like to compare prices between the item specified by the customer and a competitor's price for the same item (see FIG. 3). Step 205 in the preferred embodiment is preceded by a customer request for the vendor's price information for the item of interest. This can be in the form of selecting a specified item from a list of goods or services offered by the vendor. However, it should be apparent to one skilled in the art that other methods could be employed to dictate when the price comparison screen be brought up, such as a separate price compare button or menu having its own listing of goods or products which can be selected. Alternatively, in another embodiment, the price comparison could be performed automatically when the triggering event occurs. In step 210 the computer program acquires the data on the specified item. In the preferred embodiment this is an International Standard Book Number (ISBN number), but it should be obvious that other specifying criteria can be used such as an SKU (Stock Keeping Unit) number for general merchandise, as is familiar to those in the retail field. In step 215 the specifying criteria, such as an ISBN number, is used to request a price from a competitor. The competitor's Internet site address is retrieved from a pre-stored listing of competitors' addresses, but alternatively the computer program could present a menu of competitors from which a customer could choose. The price request is transmitted over a computer network to the competitor's site. In step 220 the computer program checks to see if a response to the request has been received. If no response has been received, the method proceeds to step 235, where an error message is displayed and the method terminates. If a response has been received, the method proceeds to step 225, where a check is performed to determine whether the specified item was available at the competitor's site. If not, the method proceeds to step 235, where an error message is displayed and the method terminates. If the specified item was available, the method in step 230 determines whether a price is available. If not, the method proceeds to step 235, where an error message is displayed and the method terminates. If the competitor's price is available, in step 240 the method checks to see if all competitor's prices were received (if multiple price requests were transmitted). If a competitor has not responded, in step 245 an error message for that competitor is displayed. In step 250, the competitor's prices are displayed to the customer by means of a new or revised display screen. In step 255 the competitor's price is compared to the item price of the vendor. If the item price is currently lower than the competitor's price, then there is no need to perform price reduction and the method is terminated. Else, in step 260, the competitor's price is compared to a predetermined threshold. The threshold level is set by the vendor. If the competitor's price is below the threshold, the method proceeds to step 265, where a message is displayed reading "go buy it at" and also displaying the competitor's name. If the competitor's price is not below the threshold, then the method proceeds to step 270, where the customer is asked if he or she wants to see a reduced price (see FIG. 4). If the customer selects a price reduction, then the method proceeds to step 275, otherwise the method terminates. The amount by which the item price may be lowered is set by the vendor. In step 275 the new price is displayed to the customer, and in step 280 the percentage of savings is also displayed.

Figure 3:
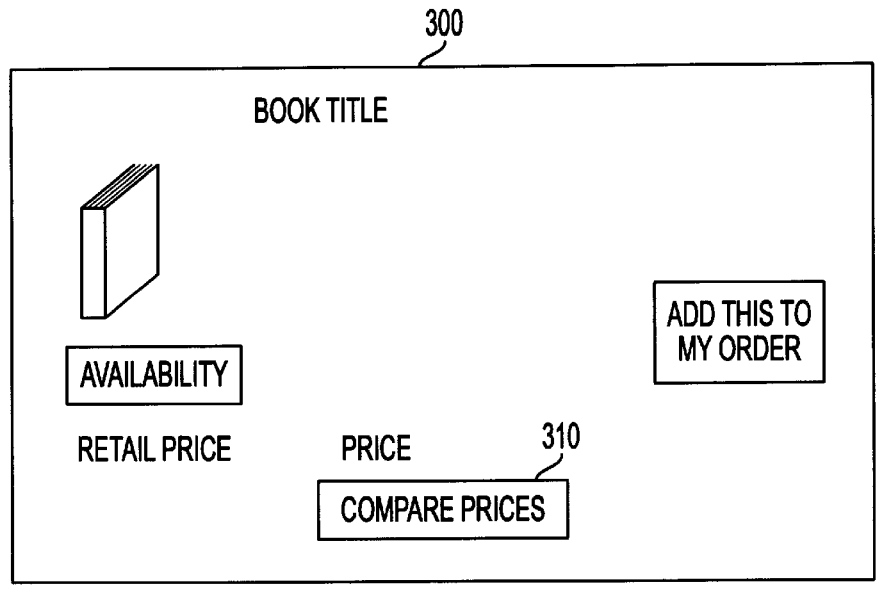
FIG. 3 shows a computer display 300 illustrating a price comparison function hyperlink according to the invention.

FIG. 3 shows a computer screen 300 that illustrates the display screen upon which the price comparison prompt appears. The computer screen 300 includes the function button 310 with which a customer can initiate the price comparison. The button 310 is defined as being an area on the computer screen wherein a cursor can be positioned and the function that the button 310 represents can be selected. It will be obvious to one skilled in the art that other methods may be employed to allow a customer to select a price comparison, such as a menu.

Figure 4:
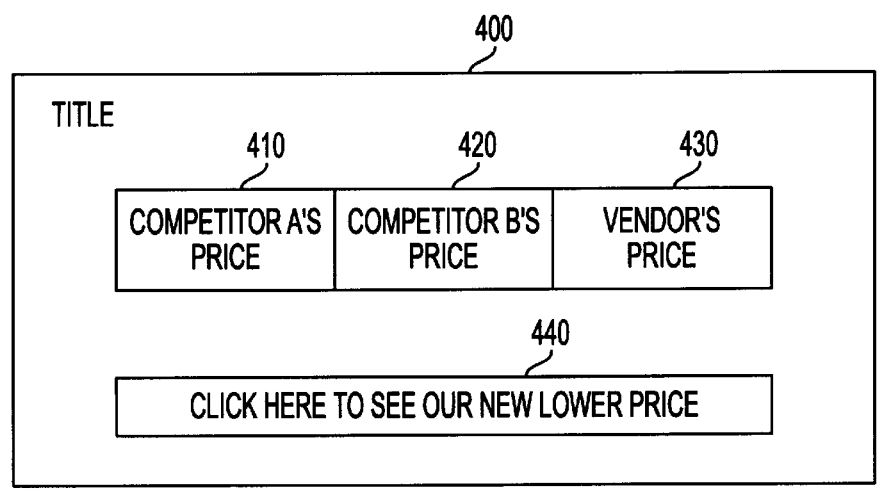
FIG. 4 shows a computer display 400 illustrating a price reduction function hyperlink.

FIG. 4 shows a computer screen 400 that illustrates the price reduction prompt. The computer screen 400 includes the display of a first competitor's price 410 (competitor A), a second competitor's price 420 (competitor B), the vendor's price 430, and a price reduction button 440. A customer can use the price reduction button 440 to request that the vendor decrease the price of the specified item.

Figure 5:
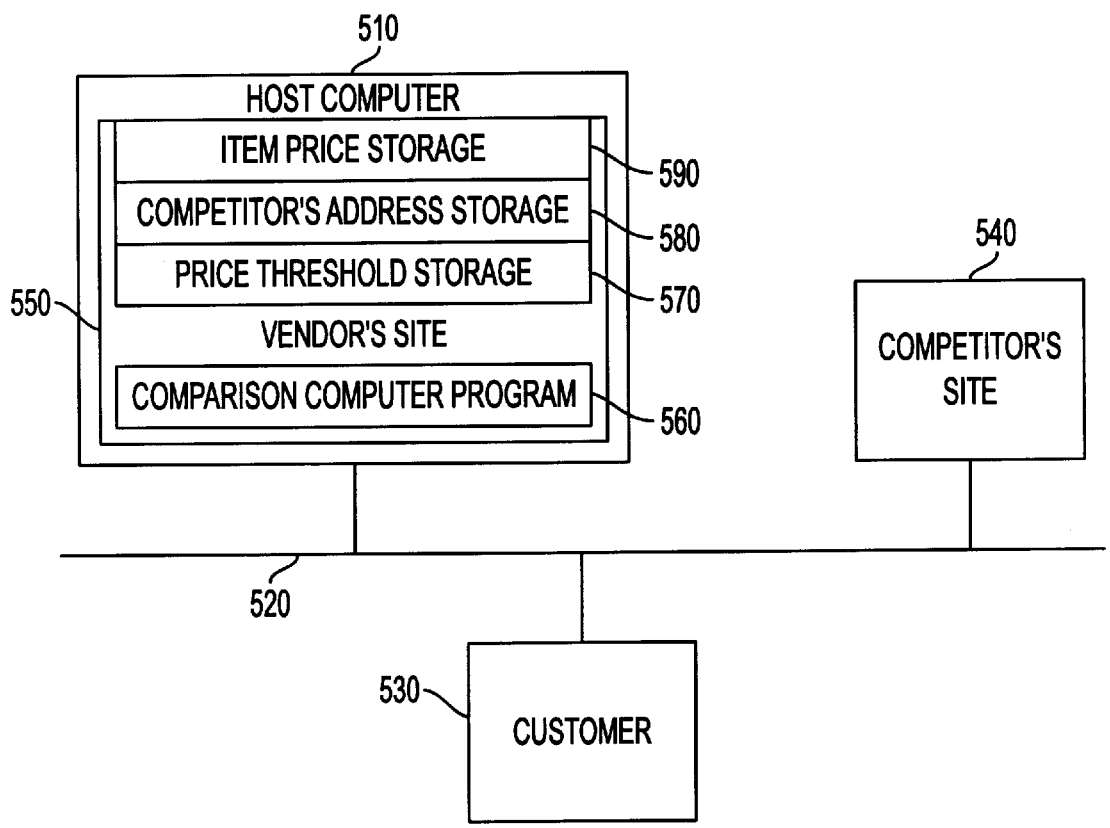
FIG. 5 shows an embodiment of apparatus on which the method of the invention can be implemented.

FIG. 5 shows an exemplary embodiment of the apparatus of the present invention. The apparatus comprises a host computer 510, a computer network 520, a customer 530 capable of communicating over the computer network 520, and a competitor's site 540. The host computer 510 further includes a vendor's site 550 which comprises a comparison computer program 560, a price threshold storage 570, a competitor's address storage 580, and an item price storage 590.

The computer network 520 is capable of transmitting information in both directions, and any computer network protocol capable of sending and receiving data can be used, including Transport Control Protocol/Internet Protocol (TCP/IP). The comparison computer program 560 is capable of performing the price comparison and reduction functions of the present invention, including obtaining a competitor's price, displaying it, and reducing the vendor's price.

The use of the price comparison and reduction apparatus is initiated when the customer 530 sends a message over the computer network 520 to the vendor's site 550 requesting information on a specified item. In response to the request, the comparison computer program 560 generates a display of the price by looking up the item price from the item price storage 590, and further displays a button which the customer 530 can use to initiate a price comparison. The comparison computer program 560 forms a price request to be sent to a competitor by using the address or addresses of competitors stored in the competitor's address storage 580. As should be apparent, multiple price requests from multiple competitors can be made by the comparison computer program 560. The request is transmitted to the competitor's site 540 over the computer network 520. It should be apparent that the competitor's site 540 may be remote from the host computer 510 or it may also reside on the host computer 510 coexistent with the vendor's site 550. When a price response is received, the comparison computer program 560 transmits the competitor's price to the customer 530, usually in the form of a new or revised display screen. Along with the competitor's price, the comparison computer program 560 may generate a button which the customer 530 can use to initiate a price reduction. First, the comparison computer program 560 must compare the competitor's price to the price of the item in the item price storage 590. If the competitor's price is higher than the item price of the vendor, no price reduction will take place. If the customer 530 elects to see a price comparison, the comparison computer program 560 must determine if the item price is capable of being lowered to beat or match the competitor's price. The comparison computer program 560 must compare the competitor's price to a predetermined threshold value located in the price threshold storage 570. The predetermined value can be of any form, including a maximum percentage of reduction or a monetary limit. An example might be a directive that an item may be reduced by as much as 20 percent. If the vendor's item price is capable of being reduced, the comparison computer program 560 reduces the price to a value less than or equal to the competitor's price, and the new price is sent to the customer 530 in the form of a new or revised display screen. The customer may then elect to purchase the item if he or she so desires.

The comparison computer program 560 may prompt the customer 530 to see if the customer 530 wishes to have the vendor's price reduced or alternatively may automatically reduce and display the vendor's price. This is a feature that may be set by the vendor. Another option is whether the reduced price is kept or discarded. If kept, the reduced price is stored in the item price storage 590 in place of the previous item price and the reduced price is used for all future price requests and sales. Alternatively, the reduced price may be elected to be discarded after use by the customer 530. In this option, a subsequent customer would buy at the regular price if no price comparison were requested.

While the invention has been disclosed in detail above, the invention is not intended to be limited strictly to the invention as disclosed. It is evident that those skilled in the art may now make numerous uses and modifications of and departures from the specific embodiments described herein without departing from the inventive concepts.

What is claimed is:

1. A method for a computer-implemented on-line price comparison over a computer network of goods and/or services sold by a vendor over said computer network, comprising the steps of:

requesting through said computer network from a competitor's database a price for an item sold by the competitor over said computer network;

receiving from said database said competitor's price;

displaying said competitor's price on a display;

decreasing the price of said item sold by the vendor by a predetermined amount to create a new price if said competitor's price is less than said item price; and displaying said new price on said display.

2. The method of claim 1, wherein the step of requesting a competitor's price is in response to a customer request.

3. The method of claim 1, wherein the step of decreasing comprises the further step of determining whether said competitor's price is greater than a predetermined threshold before decreasing said item price.

4. The method of claim 1, wherein the step of requesting said competitor's price is initiated by a customer.

5. The method of claim 1, wherein said item is a book.

6. The method of claim 5, wherein the step of requesting said competitor's price further comprises requesting said competitor's price for said book using an international standard book number (ISBN).

7. The method of claim 1, further including the steps of detecting whether said competitor's price was received and displaying an error message on said display if said competitor's price was not received.

8. The method of claim 1, wherein the step of decreasing said item price to create said new price is in response to a request by a customer to view a new vendor price.

9. The method of claim 3, wherein the step of decreasing said item price further comprises the steps of:

comparing said competitor's price to an item price;

comparing said competitor's price to a predetermined threshold if said competitor's price is less than said item price; and decreasing said item price by a predetermined amount to create a new price if said competitor's price is less than a predetermined threshold.

10. The method of claim 9, wherein the step of comparing said competitor's price to said predetermined threshold generates a predetermined message to said customer if said competitor's price is less than said predetermined threshold.

11. The method of claim 1, wherein the step of displaying said new price further includes displaying a quantity of savings given by said new price.

12. The method of claim 1, wherein said new price is stored in place of said item price.

13. A method for a computer implemented on-line price comparison over a computer network of goods and/or services sold by a vendor over said computer network, comprising the steps of:

requesting from a competitor's database a competitor's price for an item over said computer network in response to a request by a customer;

detecting whether said price was received;

displaying said competitor's price for said item if said competitor's price was received and displaying an error message if said competitor's price was not received;

comparing said competitor's price to the vendor's item price;

comparing said competitor's price to a predetermined threshold if said competitor's price is less than said item price;

decreasing said item price by a predetermined amount to create a new price if said competitor's price is greater than a predetermined threshold in response to a request by said customer; and displaying said new price.

14. The method of claim 13, wherein said item is a book.

15. The method of claim 14, wherein the step of requesting said competitor's price further comprises requesting said competitor's price for said book using an international standard book number (ISBN).

16. The method of claim 13, wherein the step of comparing said competitor's price to said predetermined threshold generates a message to said customer if said competitor's price is less than said predetermined threshold.

17. The method of claim 13, wherein the step of displaying said new price further includes displaying a quantity of savings given by said new price.

18. The method of claim 13, wherein said new price is stored in place of said stored price.

19. An apparatus for performing a computer implemented on-line price comparison over a computer network of goods and/or services sold by a vendor with those of a competitor, comprising:

storage means for storing an item price;

input means for receiving a comparison request for a competitor's price;

procurement means for procuring said competitor's price over said computer network;

display means for displaying said item price and said competitor's price;

comparison means for comparing said item price and said competitor's price; and adjustment means for adjusting said item price by a predetermined amount to create a new price if said item price is greater than said competitor's price.

20. The apparatus of claim 19, wherein said item is a book.

21. The apparatus of claim 19, wherein said computer network comprises the Internet.

22. The apparatus of claim 19, wherein said computer network further comprises a local area network.

23. The apparatus of claim 19, wherein said computer network further comprises a wide area network.

24. The apparatus of claim 19, wherein said computer network further comprises an electronic bulletin board service.

25. The apparatus of claim 19, wherein said storage means comprises a computer memory.

26. The apparatus of claim 19, wherein said storage means stores said item price of a book.

27. The apparatus of claim 19, wherein said input means receives said comparison request over said computer network from a customer.

28. The apparatus of claim 19, wherein said procurement means will procure said competitor's price in response to a customer request.

29. The apparatus of claim 19, wherein said procurement means will procure said competitor's price in response to a customer access of said item.

30. The apparatus of claim 20, wherein said procurement means procures said competitor's price for said book using an international standard book number.

31. The apparatus of claim 19, wherein said adjustment means causes said new price to be displayed on said display means.

32. The apparatus of clam 19, wherein said new price is stored in said storage means.

* * * * *